(12) United States Patent
Otterbach et al.

(10) Patent No.: US 6,587,769 B2
(45) Date of Patent: Jul. 1, 2003

(54) METHOD AND DEVICE FOR CONTROLLING FIRING CIRCUITS FOR RESTRAINING DEVICES

(75) Inventors: Jens Otterbach, Wenden (DE); Hartmut Schumacher, Freiberg (DE); Peter Taufer, Renningen (DE); Achim Henne, Sachsenheim (DE); Harald Tschentscher, Grossbottwar (DE); Michael Ulmer, Moessingen (DE); Andreas Rupp, Reutlingen (DE)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 09/990,530

(22) Filed: Nov. 20, 2001

(65) Prior Publication Data
US 2002/0177933 A1 Nov. 28, 2002

(30) Foreign Application Priority Data

Nov. 21, 2000 (DE) .......................... 100 57 917

(51) Int. Cl.$^7$ .............................. B60R 21/32
(52) U.S. Cl. ................ 701/45; 280/734; 280/735; 307/9.1
(58) Field of Search .................. 701/45, 34, 36; 280/734, 735; 307/9.1, 10.1; 102/293, 218, 206

(56) References Cited

U.S. PATENT DOCUMENTS

| 5,085,464 | A | * | 2/1992 | Behr et al. ................ 280/735 |
| 5,216,607 | A | * | 6/1993 | Diller et al. ................ 701/45 |
| 5,409,258 | A | * | 4/1995 | Kawabata ................ 280/735 |
| 5,796,177 | A | * | 8/1998 | Werbelow et al. ......... 307/10.1 |
| 5,825,098 | A | * | 10/1998 | Darby et al. ............... 307/10.1 |
| 5,841,367 | A | * | 11/1998 | Giovanni .................... 340/903 |
| 5,845,729 | A | * | 12/1998 | Smith et al. ................ 180/282 |
| 5,861,681 | A | * | 1/1999 | Nakano et al. ............ 307/10.1 |
| 5,882,034 | A | * | 3/1999 | Davis et al. ................ 280/735 |
| 5,977,651 | A | * | 11/1999 | Ueda et al. ................ 307/10.1 |
| 5,977,653 | A | * | 11/1999 | Schmid et al. ............. 307/10.1 |
| 6,023,664 | A | * | 2/2000 | Bennet ........................ 702/141 |
| 6,109,648 | A | * | 8/2000 | Luo et al. ................... 280/735 |
| 6,279,479 | B1 | * | 8/2001 | Hermann ..................... 102/218 |
| 6,293,583 | B1 | * | 9/2001 | Fujishima et al. .......... 280/735 |
| 6,363,307 | B1 | * | 3/2002 | Ikegami ....................... 701/45 |
| 6,465,907 | B2 | * | 10/2002 | Ueno et al. ................. 307/10.1 |

FOREIGN PATENT DOCUMENTS

| DE | 39 25 594 | 3/1990 |
| DE | 42 37 404 | 5/1994 |
| DE | 195 31 899 | 3/1997 |
| DE | 198 19 124 | 11/1999 |
| EP | 0 410 108 | 1/1991 |
| WO | WO 00/41918 | 7/2000 |

* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A device and a method are proposed for controlling firing circuits for an element of restraint, individual transistors of the output stages being controlled by bit combinations, and impermissible bit combinations lead to an error message to a processor. In addition, a firing current is measured, in order to estimate a firing energy from it, so that efficient energy management can be carried out. Furthermore, determination of the firing current makes it possible to update a crash protocol as to whether the firing circuit was activated or not. When a voltage of the energy reserve is exceeded, it is further proposed to switch over to pulse operation for operating the output stages. Thereby a greater resistance to short-circuits and a higher efficiency are achieved.

10 Claims, 2 Drawing Sheets

METHOD AND DEVICE FOR CONTROLLING FIRING CIRCUITS FOR RESTRAINING DEVICES

FIELD OF THE INVENTION

The present invention relates to a device and a method for controlling firing circuits for restraining devices.

BACKGROUND INFORMATION

In air bags, integrated switching circuits for controlling firing circuits are already being used, wherein single bits in a firing command control single transistors in output stages. Firing commands that are not recognized are ignored, and there is no reaction.

SUMMARY OF THE INVENTION

The device according to the present invention and the method according to the present invention for controlling firing circuits for restraining devices have the advantage, compared to that, that by using a bit combination, each controllable transistor is clearly identified, as a result of which a bit error does not create false signals by mistake. When a bit error occurs, the error recognition of the firing control recognizes it and notifies the processor. It is also of advantage that a faulty processor cannot release all output stages because of the inhibiting inputs present for the plus and minus output stages and the corresponding enabling commands. Beyond that, it is of advantage that the firing current is now clearly measurable, so that, on account of that, a notification on the functionability of the restraining devices is possible. The switchover between a pulse operation and a continuous operation of the output stages also leads to a higher firing speed or rather, higher firing efficiency.

It is of particular advantage that the element for measuring the firing current registers a current of a reference current source in connection with the adjustment information to a predefined desired current in a plus output stage, in each case, and stores the respective measuring result in a firing current register, so that this measuring result can then be transmitted to a crash recorder. The current source is, for instance, a current mirror in the plus output stage. In lawsuits, the record of the firing circuit's activity is of advantage as proof. Furthermore, measuring the firing current to determine the firing energy is of advantage since, when the minimum firing current is known, the minimum firing energy can be calculated from this firing current, the resistance of the firing circuit and the firing time. This, then, makes possible intelligent energy management for the purpose of switching off the output stage transistors for firing of the firing element as soon as these are no longer needed, that is, when the minimum firing energy has already been reached. That also means that a smaller capacitor can be used as energy store for the energy reserve.

In addition, it is of advantage that the firing circuit control sends an error message to the processor, if a faulty bit combination was received, which activates no transistor, so that the processor can react accordingly, and can check its own functionability. This increases the safety of the whole system.

Again, it is of advantage that a switchover between pulsed operation and continuous operation of the output stages is carried out as a function of the energy reserve voltage, at high voltages high current firing being carried out, namely using pulsed operation, and this increasing firing efficiency and firing speed. The firing efficiency increases based on the higher voltage at the firing element, brought on by the high current firing—at simultaneously lower voltage drop at the output stage. In the case of currently used pyrotechnical firing elements, the triggering time decreases rapidly with increasing firing current, whereby firing speed is raised. Using pulsed operation, the plus output stage becomes short-circuit-resistant to short-circuit to ground, since from the pulsing at the output stage transistor only a limited power is created, which is smaller than that which is maximally permissible. Beyond that, in pulsed operation it is possible to have higher firing currents without thermal overload of the plus output stage. In addition, the area of the plus output stage on an integrated circuit can be made smaller.

DETAILED DESCRIPTION

Air bags are increasingly being applied in motor vehicles in larger numbers and having greater intelligence. The firing of air bags is effected by a firing circuit control which is usually present on an integrated circuit. It is the task of the firing circuit control to activate the transistors of the output stages correctly, namely as a function of firing instructions which come from a processor of the air bag control unit, to monitor the firing current, and optimally to manage the energy available for firing.

Therefore, according to the present invention, a device and a method for controlling firing circuits for restraint devices is proposed, the device having the appropriate arrangement for performing these tasks, and in the method, in particular a bit combination being used for controlling the individual transistors; in case of a bit error, the bit combination not being about to activate any other transistor, so that no erroneous activation of an output stage will occur, because a bit error of a permissible bit combination automatically leads to an impermissible bit combination.

Figure 1:
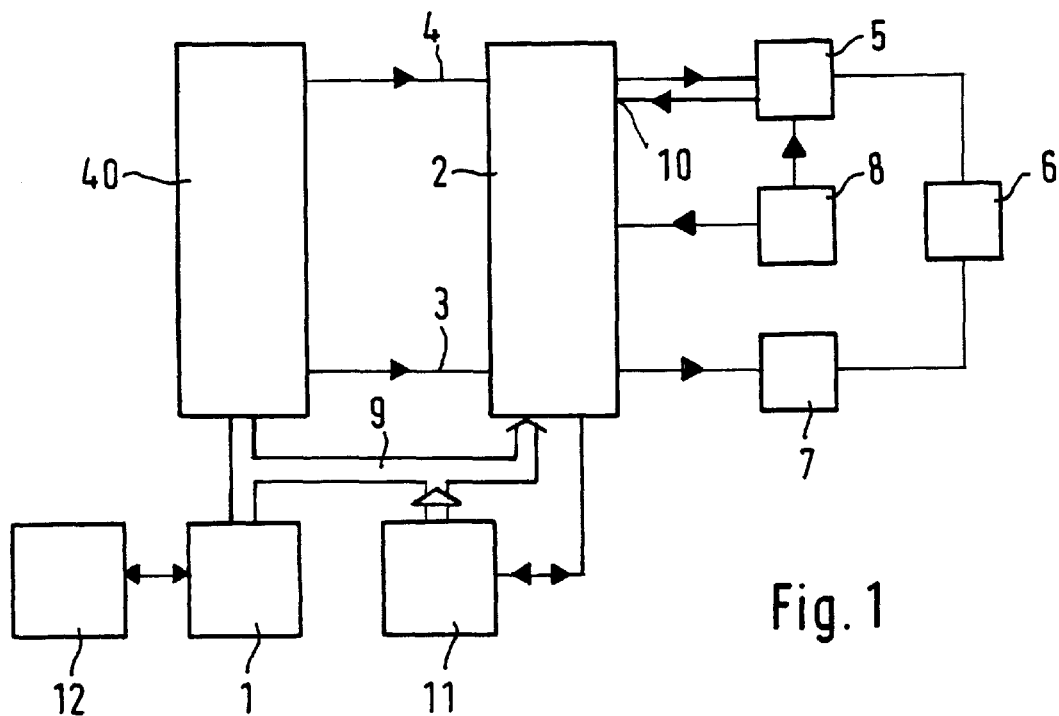
FIG. 1 shows a block diagram of the device according to the present invention.

FIG. 1 shows the block diagram of the device according to the present invention. A processor 1 of an air bag control device is connected to a firing circuit control 2 via a first data input/output, a safety IC (integrated circuit) 40 as well as a firing current register 11. Firing circuit control 2 itself represents an integrated circuit, that is, an IC. Processor 1 is connected to a firing current register 11 via a data input/output. Safety IC 40 is connected to a first inhibiting input of firing current control 2 via a first data output, this first inhibiting input being used to suspend minus output stages of firing circuits.

Safety IC 40 is connected to a second inhibiting input of firing current control 2 via a second data output, this second inhibiting input being used to disable plus output stages of the firing circuits. A plus output stage 5 is connected to an energy reserve 8 for voltage supply, which has essentially at least one capacitor as an energy store. This energy reserve 8 is used for igniting a firing element connected to output stages 5 and 7. Energy reserve 8 is additionally connected to firing circuit control 2 for registering the energy reserve voltage. Firing circuit control 2 is connected to a minus output stage 7 via a first output. Firing circuit control 2 is connected to a plus output stage 5 via a second output. Firing circuit control 2 is connected to plus output stage 5 via an input. On the other side of plus output stage 5 a firing element 6 is connected, which is also connected on the other side to minus output stage 7. Plus output stage 5 has a current limitation, while minus output stage 7 does not have this. Firing circuit control 2 is connected to a second data input/output of firing current register 11, via a second data input/output. Processor 1 writes on crash recorder 12. Here there is only one plus output stage or minus output stage, as the case may be, but it is possible to provide several pairs of plus and minus output stages, to the extent that there are correspondingly more firing circuits present.

Firing element here especially means a priming cap.

Safety IC 40 and processor 1, which are located in a control device of the air bag, are connected to sensors via data connections not shown here, in order to be able to recognize a triggering case for the way of restraint independently of one another. Such sensors may be, for example, acceleration sensors or pressure sensors for sensing side impact. Safety IC 40 fulfills the function of plausibility checking of the sensor values, and recognizes from data in its own hardware whether a triggering case exists or not. In a triggering case, safety IC 40 releases the output stages. Safety IC is thus like a safety switch, which, however, reacts to sensor values from all directions.

In the triggering case, then, the air bags are fired as elements of restraint. Then processor 1 transmits a firing command to firing circuit control 2 via data connection 9 which activates various transistors of output stages 5 and 7. However, safety IC 40 first sets the disable inputs 3 and 4 with appropriate enable commands, so that output stages 5 and 7 are each enabled. Then processor 1 transmits the firing command by activating the transistors. The following bit combinations are used, for example. Bit combination 01 means that an output stage transistor is connected, and bit combination 10 means that the respective output stage transistor is disconnected. Bit combinations 00 and 11 are not permissible. The command is then refused accordingly. Firing circuit control 2 will subsequently set an error bit, in order to signal this error to processor 1, which is a microcontroller here. By use of these bit combinations, it is made clear that when a bit error occurs, the bit combinations 01 and 10 become impermissible commands. That is, the error is recognized. Both bits have to be in error for bit combination 01 and 10 so as to lead to a faulty reaction. In this case, if a data capacity of 8 bits is used, four transistors of the output stages can be controlled by the four bit pairs. The bit pairs are then permanently assigned to the transistors. For that, data line 9 is appropriately designed.

Firing circuit control 2 then correspondingly controls the transistors of plus output stage 5 and minus output stage 7. As an example, only one plus output stage and one minus output stage each are connected here. However, substantially more plus output stages and minus output stages, and thus also firing circuits, can be connected. Firing circuit control 2 then registers, via data input 10, a reference current of a current mirror in plus output stage 5 and the adjustment information of plus output stage 5 to the desired current. The adjustment information is a digital signal, such as a bit or a bit combination which indicates that a predefined threshold current was reached. Both quantities, the reference current and the adjustment information are linked logically in order to estimate the firing current. Here, an AND link is selected for the logical linking. The current mirror is used here, for instance, as a regulated current source. If this firing current reaches a minimum predefined threshold value, firing circuit control 2 sets firing control register 11. This firing current register 11 is read out cyclically by processor 1, and the content is permanently stored in crash recorder 12. This is of interest for subsequent lawsuits, so as to be able to prove the functionality of the restraint system. It is further possible to estimate the firing energy with the minimum firing current. The firing energy is calculated from the following formula:

$$\text{Energy} = I_{min} * I_{min} * \text{firing circuit resistance} * \text{firing time}$$

With that, after the firing energy sufficient for firing has been reached, the output stage of the software can be switched off, so as not to discharge the energy reserve capacitor in energy reserve 8 unnecessarily.

The available plus output stages are either pulsed or activated in continuous operation as a function of the energy reserve voltage in energy reserve 8. If a predefined voltage threshold for the energy reserve voltage is exceeded, efficiency-optimized pulse operation takes place, i.e. pulse output stage 5 is automatically switched on and off by a predefined, fixed pulse/pause ratio. If the voltage lies below it, continuous operation is applied. The switching change is done automatically. A firing mode once selected, that is, either pulse operation or continuous operation, remains so for the duration of the firing, independently of the further course of the energy reserve voltage. Using pulse operation, plus output stage 5 becomes short-circuit-resistant to short-circuits to ground. In addition, in pulse operation greater firing currents are possible without thermal overload of plus output stage 5.

Figure 2:
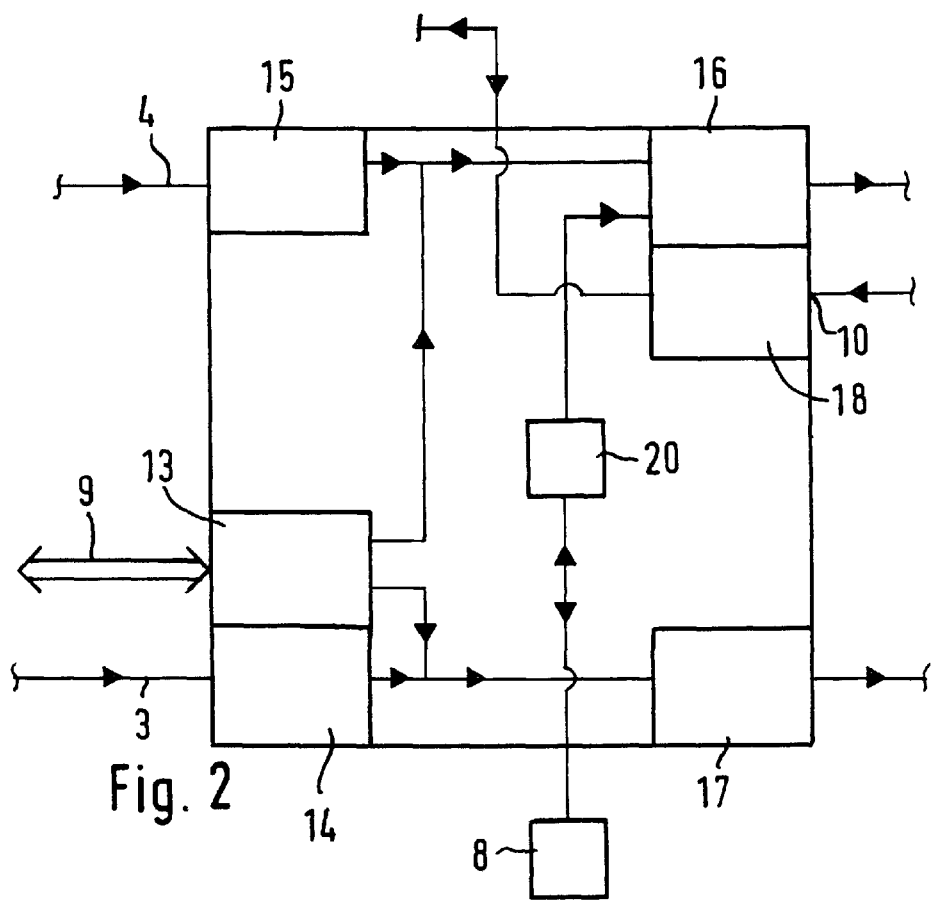
FIG. 2 shows a block diagram of the firing control circuit.

In FIG. 2 firing circuit control 2 is shown in detail in a block diagram. At inhibiting inputs 3 and 4, in each case logic circuits are present on the IC of firing circuit control 2, which cause the release or inhibiting of plus output stage 5 or minus output stage 7, respectively. For this purpose, function block 15 is connected to a function block 16 which carries out the control of the plus output stage. Function block 14, however, is connected to function block 17, which controls the minus output stage. Function blocks 16 and 17 then process the pertinent enabling commands.

Function block 13 is connected to data connection 9, over which the control commands are transmitted. The control commands are here transmitted via the so-called serial peripheral interface (SPI), the transmission being sequenced in so-called SPI data frames. Function block 13 evaluates whether the received control bit combinations are permissible or not. If an impermissible value appears, processor 1 is notified in the next SPI data frame by setting an error bit. Thus, function block 13 is connected to function block 16 via a first data output, and to function block 17 via a second data output in order to cause the appropriate control of the transistors of plus and minus output stages 5 and 7. Function block 18, to which data are transmitted via input 10, carries out the above-described firing current registration by measuring a reference current in a regulated current source, here a current mirror, of the plus output stage. In addition, the adjustment information of the plus output stage to desired current is logically linked to the presence of the reference current. If this firing current exceeds a minimum desired current, function block 18 transmits this result to firing current register 11, so as to set there a corresponding bit when the minimum firing current is exceeded. The firing energy can be calculated from the minimum firing current, in order then to switch off the output stages so as to save energy, using processor 1.

A function block 20 is connected to energy reserve 8 for measuring the energy reserve voltage of energy reserve 8. If this energy reserve voltage is less than a predefined value, then function block 20, which is connected to function block 16 via a data connection, controls function block 16 in such a way that pulse operation of the plus output stages is present. This pulse operation is efficiency-optimized and permits higher firing currents, without giving rise to thermal overload of the plus output stage.

A function block 20 is connected to energy reserve 8 for the purpose of measuring the energy reserve voltage of energy reserve 8. If this energy reserve voltage is greater than a predefined value, function block 20, which is connected to function block 16 via a data connection, switches function block 16 so that pulse operation of the plus output stages is present. This pulse operation is efficiency-optimized and permits larger firing currents, without giving rise to thermal overload of the plus output stages.

Figure 3:
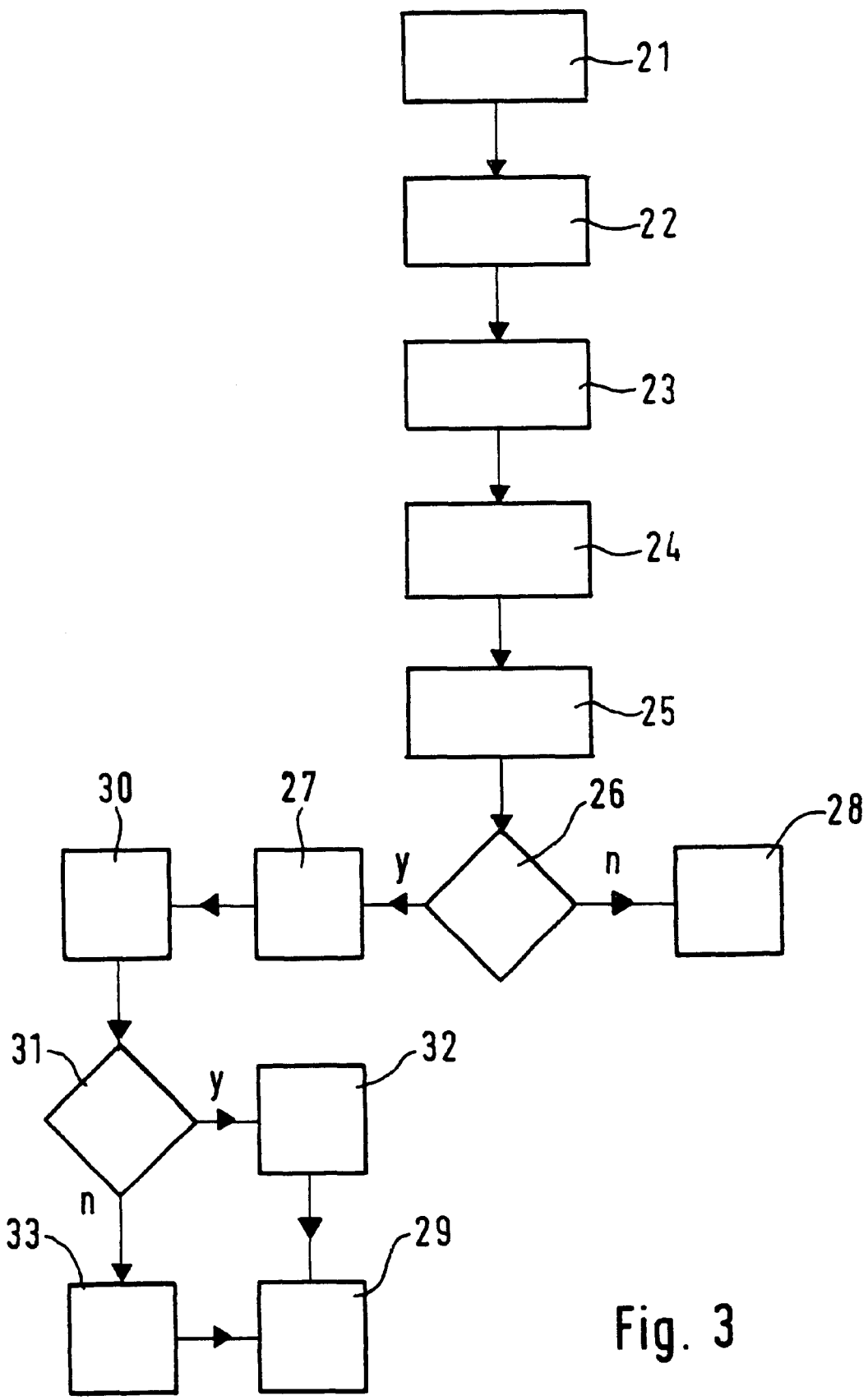
FIG. 3 shows a flow diagram of the method according to the present invention.

In FIG. 3, the method according to the present invention is represented as a flow chart. In method step 21, safety IC 40 and processor 1 have recognized from sensor values that the restraint systems should be fired, and that they should send a firing command to firing circuit control 2. In method step 22 it is determined which output stages are to be activated. Activation of each output stage then begins in method step 23. For this purpose, inhibiting inputs 3 and 4 are first set to a low potential by safety IC 40. In method step 24, processor 1 releases plus and minus output stages 5 and 7 by giving two enabling commands. In method step 25, the activating commands, which are put into effect by the above-described bit combinations, are transmitted to firing control 2, via data connection 9. The activation of output stages 5 and 7 is only possible by maintaining this sequence, otherwise output stages 5 and 7 would automatically be disabled again.

In method step 26, function block 13 checks whether the bit combinations are permissible or not. If the bit combinations are permissible, then in method step 27 activating the output stages is performed by function blocks 16 and 17. If the bit combinations were not permissible, then in method step 28, processor 1 is notified via data connection 9 that the activating commands are faulty. In method step 29, which follows method step 32 or 33, flow of the minimum firing current in plus output stage 5 is then determined by function block 18. The result is then transmitted by function block 18 to firing current register 11. The firing energy can be ascertained from the firing current. As soon as the firing energy has reached a minimum value, plus output stage 5 and minus output stage 7 are switched off by processor 1, in order to save energy. In addition, the voltage of energy reserve 8 is checked. This is done in method step 30. If the voltage of the energy reserve is greater than a predefined value, function block 20 controls function block 16 in such a way that plus output stage 5 is operated in pulse operation. This is checked in method step 31, in order to apply pulse operation, if necessary, in method step 32, and, in case the voltage is less than the predefined threshold, to use continuous operation in method step 23.

What is claimed is:

1. A device for controlling firing circuits for elements of restraint in a motor vehicle, comprising:

a processor;

a firing circuit control;

a plurality of firing elements;

a plurality of output stages for each of the plurality of firing elements, each output stage being in communication with a respective inhibiting input for releasing an associated one of the plurality of output stages;

an energy reserve for an operation of the firing circuits, the firing circuits including the plurality of output stages and the plurality of firing elements, wherein:

the processor releases the plurality of output stages for triggering the elements of restraint when a crash of the motor vehicle occurs; and a safety IC for releasing the plurality of output stages during the crash and including an arrangement for performing a crash recognition, wherein the firing circuit control includes:

an arrangement for evaluating an activating command, an arrangement for operating the plurality of output stages, an arrangement for measuring a firing current, an arrangement for handling an error in the activating command, and an arrangement for measuring an energy reserve voltage and for switching between a pulse operation and a continuous operation for the plurality of output stages, the safety IC setting each inhibiting input after a start-up of the device.

2. The device according to claim 1, further comprising:

a crash recorder; and a firing current register, wherein:

the arrangement for measuring the firing current registers a current of a current source, in each case, in one of the plurality of output stages and stores a measuring result in the firing current register, the measuring result then being transmittable to the crash recorder.

3. The device according to claim 2, wherein:

the arrangement for measuring the firing current logically links a reference current of a regulated current source of the one of the plurality of output stages and an adjustment information, so as to determine whether the firing current is present.

4. The device according to claim 1, wherein:

the arrangement for handling the error in the activating command transmits an error message to the processor when the arrangement for handling the error in the activating command recognizes the activating command as being faulty.

5. The device according to claim 3, wherein:

for a registration of a firing energy, the processor uses the measuring result from the firing current register for ascertaining the firing energy, and the processor switches off the plurality of output stages by using the firing circuit control when the firing energy reaches a predefined value.

6. The device according to claim 1, wherein:

the arrangement for measuring the energy reserve voltage and for switching between the pulse operation and the continuous operation registers the energy reserve voltage and compares the energy reserve voltage to a threshold value, and the arrangement for measuring the energy reserve voltage and for switching between the pulse operation and the continuous operation switches to the pulse operation when the threshold value is exceeded, and otherwise to the continuous operation.

7. The device according to claim 1, wherein:

the safety IC disables the plurality of output stages by setting each respective inhibiting input.

8. A method for controlling firing circuits for elements of restraint, in which output stages include transistors, the method comprising the steps of:

causing a processor to activate the firing circuits via a firing circuit control;

in order to achieve a control of the processor, providing at least two bits as a bit combination for controlling one of the transistors; and signaling an error message to the processor by the firing circuit control when an impermissible bit combination occurs.

9. The method according to claim 8, further comprising the step of:

activating one of the output stages by performing a sequence that includes:

placing inhibiting inputs of the firing circuit control for the output stages at a predefined voltage level by the safety IC, causing the processor to send a release command for each one of a plurality of function blocks, and causing the firing circuit control to receive a bit combination for activating the one of the output stages from the processor.

10. The method according to claim 9, wherein:

when the sequence is not maintained, an automatic breaking off of the activating of the one of the output stages occurs.

* * * * *